(12) United States Patent
Yang et al.

(10) Patent No.: US 9,365,242 B1
(45) Date of Patent: Jun. 14, 2016

(54) TUBULAR VEHICLE ROOF PILLAR REINFORCEMENT

(71) Applicant: Ford Global Technologies, LLC, Dearborn, MI (US)

(72) Inventors: Herbert Yang, Saline, MI (US); Zhenyan Gao, Northville, MI (US); Ryan Craig, Harrison Township, MI (US); Jeffrey Lichtner, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/710,825

(22) Filed: May 13, 2015

(51) Int. Cl.
*B62D 25/04* (2006.01)
*B62D 21/15* (2006.01)

(52) U.S. Cl.
CPC .............. *B62D 25/04* (2013.01); *B62D 21/157* (2013.01)

(58) Field of Classification Search
CPC .............................. B62D 25/04; B62D 25/157
USPC ........................................ 296/193.06, 187.12
See application file for complete search history.

(56) References Cited

U.S. PATENT DOCUMENTS

| 7,357,448 | B2 | 4/2008 | Chen et al. | |
| 8,517,458 | B2 | 8/2013 | Lassl et al. | |
| 8,662,567 | B2 * | 3/2014 | Aul | B62D 25/04 296/193.05 |
| 2012/0256445 | A1 | 10/2012 | Baccouche et al. | |
| 2012/0261950 | A1 * | 10/2012 | Balzer | B62D 25/04 296/193.05 |
| 2012/0313400 | A1 | 12/2012 | Balzer et al. | |
| 2014/0191536 | A1 * | 7/2014 | Elfwing | B62D 25/04 296/193.06 |
| 2014/0232138 | A1 * | 8/2014 | Kanaguichi | B62D 25/04 296/187.12 |
| 2015/0203158 | A1 * | 7/2015 | Oxley | B62D 25/20 296/203.03 |

FOREIGN PATENT DOCUMENTS

| CA | 2569999 A1 | 6/2008 |
| KR | 20090061895 A | 6/2009 |

OTHER PUBLICATIONS

SAE International, Automotive Engineering Magazine, Hydroformed Pillars are world's first in 2013 Ford Fusion, Sep. 24, 2012.

* cited by examiner

*Primary Examiner* — Jason S Morrow
(74) *Attorney, Agent, or Firm* — Jason Rogers; Brooks Kushman P.C.

(57) ABSTRACT

A pillar assembly for a vehicle includes an outer panel, a reinforcement and an inner panel. The outer panel extends from a roof to a rocker. The reinforcement is attached to the outer panel and extends from the roof to a lower end that is spaced from the rocker. The reinforcement defines an opening in one side extending upwardly from the lower end of the reinforcement to a hip seating reference point level. The inner panel encloses the lower end of the reinforcement in conjunction with the outer panel. The pillar reinforces the assembly to facilitate inwardly collapsing a lower portion of the pillar to a greater extent than an upper portion of the pillar in a side impact collision.

17 Claims, 3 Drawing Sheets

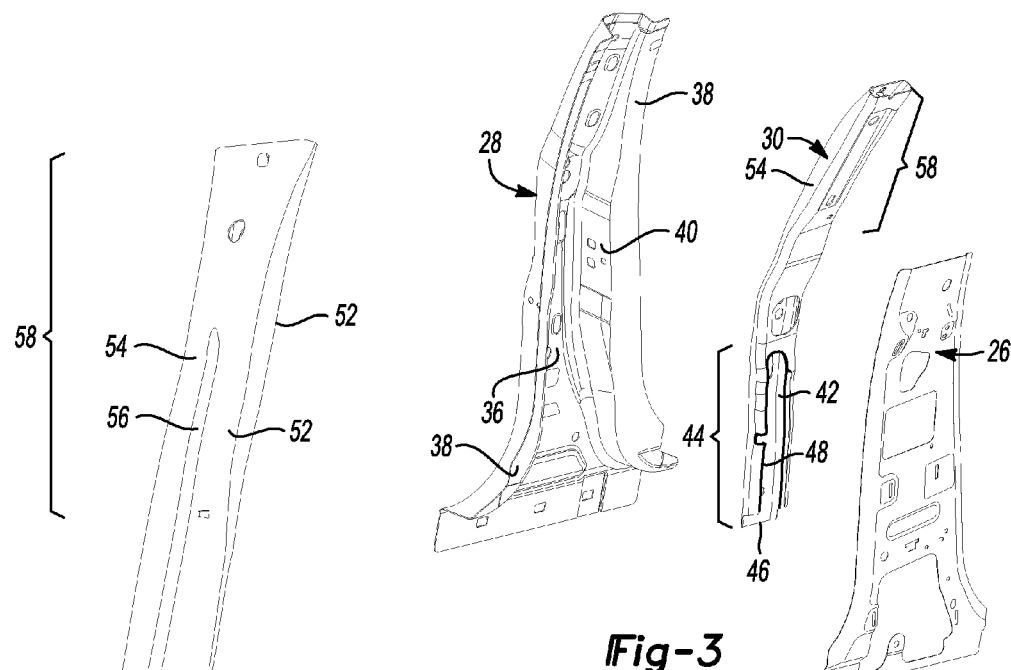
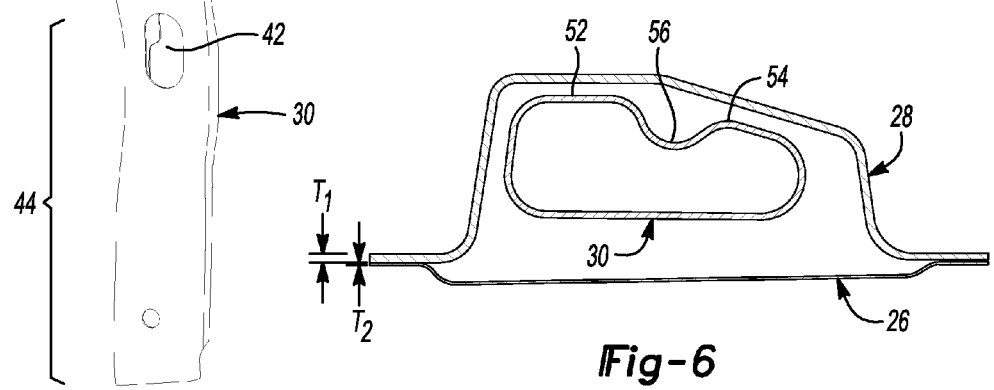
Fig-3
Fig-4
Fig-6

TUBULAR VEHICLE ROOF PILLAR REINFORCEMENT

TECHNICAL FIELD

This disclosure relates to reinforcement structures for vehicle roof pillars.

BACKGROUND

Vehicles normally have a roof supported by a plurality of pillars located between the windows of the passenger compartment of the vehicle. The pillars may be referred to as A, B, C and D pillars. The B-pillar may also be referred to as the center pillar and is disposed between the front door and rear door of the vehicle.

The center pillar provides significant support for the vehicle roof in roll-over tests or "roof crush" tests. The pillars may be formed of thicker material, higher strength material (HSLA steel) and may be provided with additional stamped metal reinforcement parts to improve the results achieved in roof crush tests. The traditional thinking was that roof crush test results are improved by stiffening the pillar assemblies. However, forming pillars with thicker materials and adding stamped reinforcement parts may add substantial weight to the vehicle that is disadvantageous when designing vehicles that must have a reduced weight to achieve increased fuel economy.

Vehicles are also subjected to side impact tests in which a barrier or vehicle is driven into the side of the vehicle. Side impact tests are evaluated based upon the extent of deformation of the side body structure that intrudes into the passenger compartment after the test. Pillars extend downward and laterally outward from the roof and roof rails of the vehicle to the rocker panel assembly. Stiffening the pillars to improve performance as measured in roof crush tests may adversely affect side impact intrusion test results because the portions of the pillars above the vehicle seat may buckle into the upper area of the passenger compartment in the side impact test leading to an unsatisfactory test result.

There is a need to provide a cost-competitive, light weight pillar structure that meets all roof crush test and side impact tests. The pillar structure must also be compact to fit within the design parameters of the available packaging space.

This disclosure is directed to solving the above problems and other problems as summarized below.

SUMMARY

According to one aspect of this disclosure, a pillar assembly is provided for a vehicle that includes an outer panel, a reinforcement and an inner panel. The outer panel extends from a roof to a rocker. The reinforcement is attached to the outer panel and extends from the roof to a lower end that is spaced from the rocker. The reinforcement defines an opening in one side extending upwardly from the lower end of the reinforcement to a hip seating reference point level. The inner panel is attached to the outer panel and rocker to enclose the lower end.

According to other aspects of this disclosure, the inner panel partially encloses the reinforcement and may extend from the rocker to between 60% and 75% of a height of the outer panel. The reinforcement may include at least two ribs that define a recess in an upper portion of the outer panel and is located above the opening in the reinforcement. The reinforcement may be a hydro-formed tubular reinforcement and the opening in the one side of the reinforcement may span an inner side and may extend from the lower end of the reinforcement to a height of between 30% and 45% of the height of the outer panel. The reinforcement is welded to the outer panel in a face-to-face relationship.

The reinforcement may be configured to include an upper end having a stiffness of $S1$, an intermediate portion below the upper end having a stiffness $S2$ that is less than $S1$, wherein the lower end below the intermediate portion has a stiffness $S3$ that is less than $S2$, and wherein the reinforcement terminates at the lower end and wherein the reinforcement does not reinforce the inner panel and outer panel between the rocker and the lower end.

According to another aspect of this disclosure, a pillar assembly is provided for a vehicle that includes an outer panel and an inner panel attached to the outer panel. A reinforcement is attached to an upper portion of the outer panel and is disposed between the outer panel and the inner panel. The reinforcement includes a stiffening rib in a pillar level portion and includes a discontinuous wall in a seat base level portion formed by an opening extending upwardly from a lower end of the reinforcement.

According to other aspects of this disclosure, the outer panel, the inner panel and the reinforcement may provide four transversely stacked thicknesses of metal at the pillar level and three transversely stacked thicknesses of metal at the seat base level. The outer panel and the inner panel may provide two transversely stacked thicknesses of metal below the lower end of the reinforcement.

The thickness of an outer wall of the outer panel may be $T1$, the thickness of each of the two longitudinally extending walls of the reinforcement may be $T1$, and the thickness of an inner wall of the inner panel may be $T2$, wherein $T1$ is thicker than $T2$. The upper portion of the outer panel and the reinforcement may extend above a top end of the inner panel to a roof rail of the vehicle. The pillar level portion of the reinforcement may include an outer wall and an inner wall and the stiffening rib may be provided on the inner wall and a second stiffening rib may be provided on the outer wall.

The pillar assembly may further comprise an inner roof rail bracket and an outer roof rail bracket. The inner roof rail bracket may be secured to a roof rail and the outer panel and overlapping the reinforcement. The outer roof rail bracket may be secured to the roof rail and the outer panel to sandwich the reinforcement between the inner roof rail bracket and the outer roof rail bracket.

According to another aspect of this disclosure, a vehicle is disclosed that includes a vehicle body and a pillar that define a passenger compartment. The vehicle body includes a right rocker, a left rocker and a roof. The pillar extends between the rockers and the roof. A means for reinforcing the pillar is provided to facilitate inwardly collapsing a lower portion of the pillar to a greater extent than an upper portion of the pillar in a side impact collision.

The means for reinforcing may further comprise means for retaining the upper portion of the pillar in alignment with the lower portion of the pillar in a side impact collision. In addition, the means for reinforcing the pillar may include stiffening ribs on the upper portion of the pillar and an elongated opening defined by the lower portion of the pillar. The upper portion of the pillar may be tubular and the lower portion of the pillar may be a U-shaped wall.

The above aspects of this disclosure and other aspects are described in detail below with reference to the attached drawings.

BRIEF DESCRIPTION OF THE DRAWINGS

FIG. 3 is an exploded perspective view of the B-pillar including an outer panel, a reinforcement, and an inner panel.

FIG. 4 is an outside perspective view of the reinforcement.

FIG. 6 is a cross-sectional view taken along the line 6-6 in FIG. 2.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
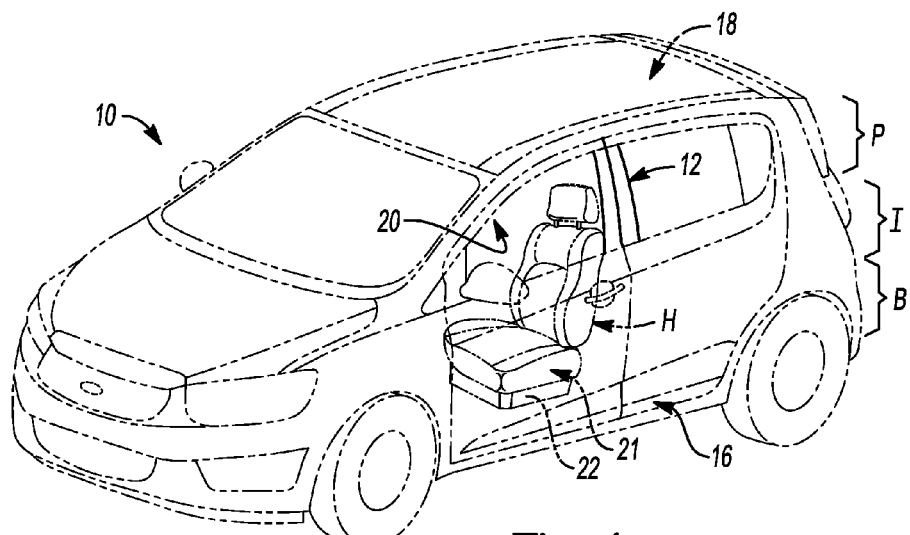
FIG. 1 is a side/front perspective view of a vehicle shown in phantom lines with a B-pillar in solid lines shown to extend from a rocker to a roof.

Referring to FIG. 1, a vehicle 10 is illustrated in phantom lines with a B-pillar assembly 12 shown in solid lines. The B-pillar assembly 12 extends from a rocker assembly 16 to a roof assembly 18 of the vehicle 10. The vehicle 10 includes a passenger compartment 20 between the B-pillar assemblies 12 on opposite sides of the vehicle 10 and between the rocker assemblies 16 and roof assembly 18. A plurality of seats 21 are provided that include a seat base 22.

The B-pillar assembly 12 may be subdivided into three portions that are generally located within a pillar level P, a seat base level B, and an intermediate portion I located between the pillar level P and seat base level B. Just above the seat base 12 is a location referred to as a hip seating reference point design position H.

Figure 2:
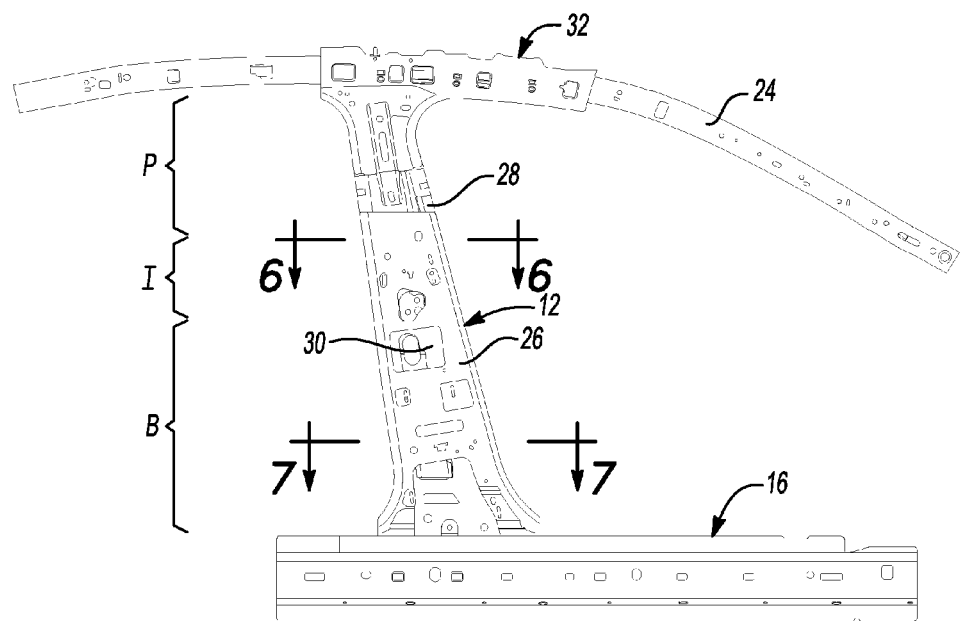
FIG. 2 is an inside plan view of the B-pillar, the rocker and the roof of a vehicle in isolation.

Referring to FIG. 2, the B-pillar assembly 12 is generally assembled between the rocker assembly 16 and a roof rail 24. The B-pillar assembly 12 includes an inner panel 26, an outer panel 28 and a reinforcement 30. The B-pillar assembly 12 is assembled to the roof rail 24 by a roof rail bracket assembly 32.

Referring to FIG. 3, the B-pillar assembly 12 is shown with the inner panel 26 and reinforcement 30 separated from the outer panel 28. The outer panel 28 includes a recess 36 that is generally a hat-shaped cross section that includes two flanges 38 provided on opposite sides of the recess 36. A rear door hinge receptacle 40 is shown inside the recess 36 that is adapted to receive the hinge of a rear door (not shown).

The reinforcement 30 defines an elongated opening 42 in a lower portion 44 generally corresponding to the seat base level B. The elongated opening 42 extends from a lower end 46 of the reinforcement 30 to the intermediate portion I of the B-pillar assembly 12. The elongated opening 42 defined by the reinforcement 30 creates a discontinuous wall 48 of the reinforcement 30. The discontinuous wall 48 is not as stiff as the other parts of the reinforcement 30 because it is not fully tubular in the area of the elongated opening 42. The reinforcement 30 includes a back rib 54 on an outer side of the reinforcement that will be described more specifically with reference to FIGS. 4-7.

Referring to FIG. 4, the outer side of reinforcement 30 is shown in isolation. The elongated opening 42 can be seen through an access hole in the outer side of the reinforcement 30. The elongated opening is located in the lower portion 44 of the reinforcement 30. A front rib 52 and the back rib 54 are shown in conjunction with a recess 56 formed on the outer side of the reinforcement 30. The front rib 52, back rib 54, and recess 56 are shown to be generally included within an upper portion 58 of the reinforcement 30.

Figure 5:
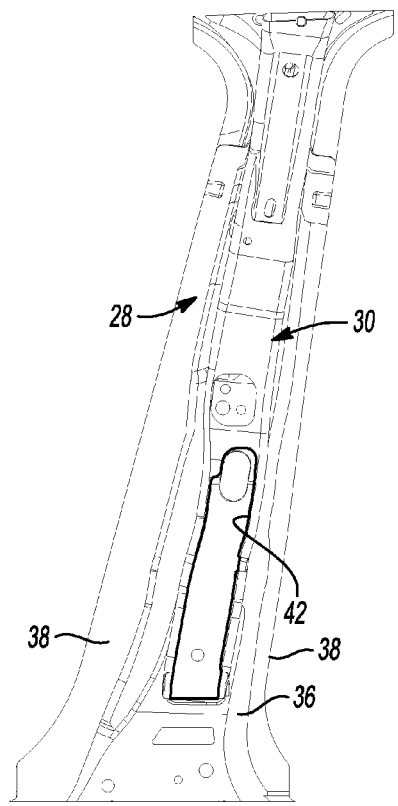
FIG. 5 is an inside elevation view of the outer panel and the reinforcement assembled together before the inside panel is assembled.

Referring to FIG. 5, the reinforcement 30 is shown as it is welded to the outer panel 28. The reinforcement 30 defines the elongated opening 42 on the inner side of the reinforcement 30. The reinforcement 30 is received within the recess 36 formed in the outer panel 28 between the flanges 38 of the outer panel 28.

Referring to FIG. 6, a section is taken through the reinforcement 30, the outer panel 28 and the inner panel 26. The cross section is taken along the line 6-6 in FIG. 2 and is representative of a cross section taken through the pillar level P of the B-pillar assembly 12. The reinforcement includes a front rib 52 and a back rib 54 that define a recess 56. The ribs 52 and 54 provide additional stiffening of the reinforcement 30. The thickness of the reinforcement 30 and the outer panel 28 corresponds to a thickness T1 that is greater than the thickness T2 of the inner panel 26.

Figure 7:
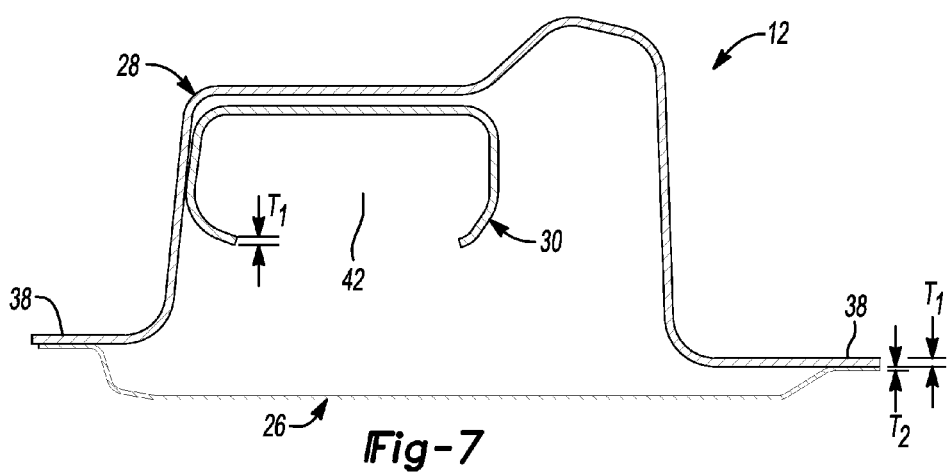
FIG. 7 is a cross-sectional view taken along the line 7-7 in FIG. 2.

Referring to FIG. 7, a section is taken through the reinforcement 30, the outer panel 28 and the inner panel 26. The cross section is taken along the line 7-7 in FIG. 2 and is representative of a cross section taken through the seat base level B of the B-pillar assembly 12. The reinforcement includes the elongated opening 42. The elongated opening 42 functions to reduce the stiffness of the B-pillar assembly at the level of the seat base B.

In a side impact, the B-pillar assembly 12 initially receives the impact load at the seat base level B. The B-pillar pivots inwardly about a pivot axis near the top of the pillar level P where the B-pillar is connected to the roof assembly 16. The lower portions of the B-pillar move more than the upper portions causing the B-pillar 12 to move in pendulum-like manner. As a result, there is less intrusion into the passenger compartment.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle pillar comprising:
an outer panel extending from a roof to a rocker;
a reinforcement attached to the outer panel extending from the roof to a lower end spaced from the rocker, the reinforcement defining an opening in one side extending upwardly from the lower end of the reinforcement to at least 30% of the outer panel height; and
an inner panel attached to the outer panel and rocker to enclose the lower end.

2. The pillar claim 1 wherein the inner panel partially encloses the reinforcement, wherein the inner panel extends from the rocker to between 60% and 75% of a height of the outer panel.

3. The pillar of claim 1 wherein the reinforcement includes at least two ribs that define a recess in an upper portion of the reinforcement that is located above the opening in the reinforcement, wherein the upper portion does not include the opening.

4. The pillar of claim 1 wherein the reinforcement is a hydro-formed tubular reinforcement and the opening in the one side of the reinforcement spans an inner side and extends from the lower end of the reinforcement.

5. The pillar of claim 1 wherein the reinforcement is connected to the outer panel in a face-to-face relationship by welds.

6. The pillar of claim 1 wherein the reinforcement is configured to include an upper end having a stiffness of $S_1$, an intermediate portion below the upper end having a stiffness $S_2$ that is less than $S_1$, wherein the lower end below the intermediate portion has a stiffness $S_3$ that is less than $S_2$, and wherein the reinforcement terminates at the lower end and wherein the reinforcement does not reinforce the inner panel and outer panel between the rocker and the lower end.

7. A pillar assembly for a vehicle comprising:
an outer panel;
an inner panel attached to the outer panel; and
a reinforcement attached to an upper portion of the outer panel and disposed between the outer panel and the inner panel, the reinforcement including an outer wall and an inner wall and a stiffening rib provided on the outer wall and second stiffening rib is provided on the outer wall at a pillar level portion, and wherein the inner wall in a seat base level portion defines an opening extending upwardly from a lower end of the reinforcement.

8. The pillar assembly of claim 7 wherein the outer panel, the inner panel and the reinforcement provide four transversely stacked thicknesses of metal at the pillar level portion and three transversely stacked thicknesses of metal at the seat base level portion.

9. The pillar assembly of claim 8 wherein the outer panel and the inner panel provide two transversely stacked thicknesses of metal below the lower end of the reinforcement.

10. The pillar assembly of claim 7 wherein the thickness of an outer wall of the outer panel is $T_1$, the thickness of each of the two longitudinally extending walls of the reinforcement is $T_1$, and the thickness of an inner wall of the inner panel is $T_2$, wherein $T_1$ is thicker than the thickness of $T_2$.

11. The pillar assembly of claim 7 wherein the upper portion of the outer panel and the reinforcement extend above a top end of the inner panel to a roof rail of the vehicle.

12. The pillar assembly of claim 7 further comprising:
an inner roof rail bracket secured to a roof rail and the outer panel and overlapping the reinforcement; and
an outer roof rail bracket secured to the roof rail and the outer panel to sandwich the reinforcement between the inner roof rail bracket and the outer roof rail bracket.

13. A vehicle comprising:
a vehicle body defining a passenger compartment including a right rocker, a left rocker and a roof;
a right pillar and a left pillar extending between the rockers and the roof; and
means for reinforcing the pillars to facilitate inwardly collapsing a seat base portion of the pillars to a greater extent than a pillar portion of the pillar in a side impact collision.

14. The vehicle of claim 13 wherein the means for reinforcing further comprises:
means for retaining the pillar portion of the pillar in alignment with the intermediate portion of the pillar in a side impact collision.

15. The vehicle of claim 13 wherein the means for reinforcing the pillar includes stiffening ribs on the pillar portion of a reinforcement and an elongated opening defined by the seat base portion of the reinforcement.

16. The vehicle of claim 15 wherein the pillar portion of the reinforcement is tubular and the seat base portion of the reinforcement is a U-shaped wall.

17. The vehicle of claim 13 wherein the pillar provides four transversely stacked thicknesses of metal in the pillar portion of the pillar and the pillar provides three transversely stacked thicknesses of metal in the seat base portion of the pillar.

\* \* \* \* \*